(12) United States Patent  (10) Patent No.: US 10,742,860 B2
Ouyang et al.  (45) Date of Patent: Aug. 11, 2020

(54) METHOD AND DEVICE FOR DOUBLE-CAMERA-BASED IMAGING

(71) Applicant: GUANGDONG OPPO MOBILE TELECOMMUNICATIONS CORP., LTD., Dongguan, Guangdong (CN)

(72) Inventors: Dan Ouyang, Dongguan (CN); Guohui Tan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 38 days.

(21) Appl. No.: 16/181,566

(22) Filed: Nov. 6, 2018

(65) Prior Publication Data

US 2019/0166288 A1   May 30, 2019

(30) Foreign Application Priority Data

Nov. 30, 2017  (CN) .......................... 2017 1 1240088

(51) Int. Cl.
  *H04N 5/225* (2006.01)
  *H04N 5/232* (2006.01)
  (Continued)

(52) U.S. Cl.
  CPC ........... *H04N 5/2258* (2013.01); *G06T 7/593* (2017.01); *H04N 5/23232* (2013.01);
  (Continued)

(58) Field of Classification Search
  CPC . G06T 2207/20016; G06T 7/593; G06T 7/55; G06T 2207/10012; H04N 5/2258;
  (Continued)

(56) References Cited

U.S. PATENT DOCUMENTS 6,178,272 B1 * 1/2001 Segman ................ G06T 3/0018
  382/298
9,118,826 B2   8/2015 Griffith et al.
  (Continued)

FOREIGN PATENT DOCUMENTS

CN   102480593 A   5/2012
CN   103329548 A   9/2013
  (Continued)

OTHER PUBLICATIONS

First Office Action of the CN application No. 201711240088.4, dated Jun. 5, 2019.
  (Continued)

*Primary Examiner* — Chiawei Chen

(57) ABSTRACT

A method and device for double-camera-based imaging are provided. The method includes the following actions. A first image is acquired by a main camera and a second image is acquired by an auxiliary camera. A main image resolution and an auxiliary image resolution are determined according to a determined shooting mode and resolutions of the main camera and the auxiliary camera respectively. The first image is converted into a main image with the main image resolution. The second image is converted into an auxiliary image with the auxiliary image resolution according to the second image. A required target image is obtained according to the main image and the auxiliary image.

18 Claims, 5 Drawing Sheets

(51) Int. Cl.
*G06T 7/593* (2017.01)
*H04N 5/262* (2006.01)

(52) U.S. Cl.
CPC ....... *H04N 5/23245* (2013.01); *H04N 5/2621* (2013.01); *G06T 2207/10012* (2013.01); *G06T 2207/20016* (2013.01)

(58) Field of Classification Search
CPC ........... H04N 5/23232; H04N 5/23245; H04N 5/2621
See application file for complete search history.

(56) References Cited

U.S. PATENT DOCUMENTS

| | | | |
|---|---|---|---|
| 9,253,397 B2 | 2/2016 | Lee | |
| 9,319,585 B1 | 4/2016 | Liu et al. | |
| 9,842,423 B2* | 12/2017 | Guo | G06T 15/00 |
| 2007/0168488 A1* | 7/2007 | Deguchi | G06Q 10/06 709/223 |
| 2010/0238327 A1 | 9/2010 | Griffith | |
| 2011/0013028 A1* | 1/2011 | Zhou | H04N 5/23248 348/208.6 |
| 2013/0021447 A1 | 1/2013 | Brisedoux | |
| 2013/0147843 A1* | 6/2013 | Shimizu | G06T 11/60 345/647 |
| 2013/0235223 A1* | 9/2013 | Park | H04N 5/23222 348/218.1 |
| 2013/0235226 A1* | 9/2013 | Karn | H04N 5/23241 348/220.1 |
| 2014/0118569 A1 | 5/2014 | Griffith et al. | |
| 2014/0132735 A1 | 5/2014 | Lee | |
| 2015/0097981 A1* | 4/2015 | Griffith | H04N 5/2251 348/218.1 |
| 2015/0104074 A1* | 4/2015 | Vondran, Jr. | H04N 13/133 382/106 |
| 2015/0365604 A1 | 12/2015 | Griffith et al. | |
| 2015/0365605 A1 | 12/2015 | Griffith et al. | |
| 2016/0205380 A1 | 7/2016 | Inoue et al. | |
| 2016/0335475 A1* | 11/2016 | Krenzer | G06T 7/77 |
| 2016/0360103 A1 | 12/2016 | Griffith et al. | |
| 2017/0104938 A1* | 4/2017 | Shimosato | H04N 5/23296 |
| 2017/0142346 A1 | 5/2017 | Hung et al. | |
| 2018/0095378 A1* | 4/2018 | Akiba | G03G 15/043 |
| 2018/0139369 A1* | 5/2018 | Chen | H04N 5/2351 |
| 2018/0227478 A1 | 8/2018 | Li | |
| 2018/0241942 A1 | 8/2018 | Griffith et al. | |

FOREIGN PATENT DOCUMENTS

| | | |
|---|---|---|
| CN | 103813108 A | 5/2014 |
| CN | 104333700 A | 2/2015 |
| CN | 105100615 A | 11/2015 |
| CN | 105141841 A | 12/2015 |
| CN | 105245775 A | 1/2016 |
| CN | 106034207 A | 10/2016 |
| CN | 106791341 A | 5/2017 |
| CN | 106851104 A | 6/2017 |
| CN | 106993112 A | 7/2017 |
| CN | 107155064 A | 9/2017 |
| CN | 107343120 A | 11/2017 |
| CN | 108024056 A | 5/2018 |
| EP | 2549763 A2 | 1/2013 |
| EP | 3048787 A1 | 7/2016 |
| JP | 2005286770 A | 10/2005 |

OTHER PUBLICATIONS

European Search Report in European application No. 18203602.0, dated Jan. 21, 2019.
International Search Report in international application No. PCT/CN2018/114924, dated Feb. 3, 2019.
Written Opinion of the International Search Authority in international application No. PCT/CN2018/114924, dated Feb. 3, 2019.

\* cited by examiner

METHOD AND DEVICE FOR DOUBLE-CAMERA-BASED IMAGING

CROSS-REFERENCE TO RELATED APPLICATIONS

This application claims priority to Chinese Patent Application No. 201711240088.4, filed on Nov. 30, 2017, the entirety of which is hereby incorporated by reference herein.

TECHNICAL FIELD

The disclosure relates to the technical field of mobile terminals, and particularly to a method and device for double-camera-based imaging.

BACKGROUND

More and more mobile terminal equipment is provided with double cameras. In a conventional art, one of double cameras is adopted to take a photo and the other camera is adopted to assist in calculation of depth information of the photo for subsequent image blurring processing.

However, for double cameras in a related art, after an image is shot, a fixed resolution is usually adopted for subsequent image processing. This results in a relatively undiversified function and makes it impossible for a user to regulate the resolution according to a requirement.

SUMMARY

According to a first aspect, a method for double-camera-based imaging is disclosed, which may include the following actions. A first image is acquired by a main camera, and a second image is acquired by an auxiliary camera. A selected shooting mode is determined. A main image resolution is determined according to the shooting mode and a resolution of the main camera, and an auxiliary image resolution is determined according to the shooting mode and a resolution of the auxiliary camera. The first image is converted into a main image with the main image resolution. The second image is converted into an auxiliary image with the auxiliary image resolution. A required target image is obtained according to the main image and the auxiliary image.

According to a second aspect, a device for double-camera-based imaging is provided. The device comprising a processor and a memory storing instructions, wherein the instructions, when executed by the processor, cause the processor to perform the method for double-camera-based imaging according to the first aspect.

According to a third aspect, a non-transitory computer-readable storage medium is disclosed. A program may be executed by a processor to implement the method for double-camera-based imaging according to the first aspect.

BRIEF DESCRIPTION OF DRAWINGS

The abovementioned and/or additional aspects and advantages of the disclosure will become apparent and easy to understand from the descriptions made to the embodiments below in combination with the drawings.

DETAILED DESCRIPTION

Figure 1:
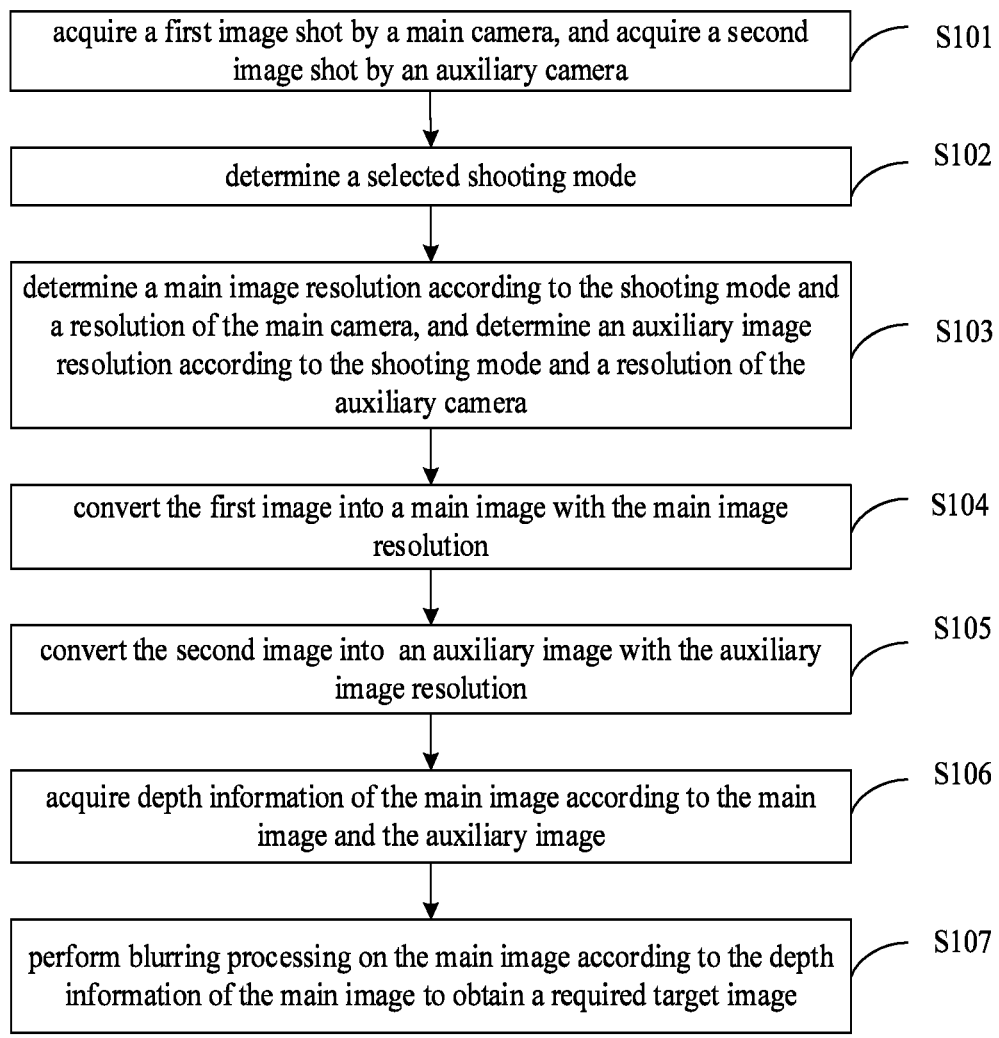
FIG. 1 illustrates a flowchart of a method for double-camera-based imaging according to an embodiment of the disclosure.

The embodiments of the disclosure will be described below in detail. Examples of the embodiments are illustrated in the drawings and the same or similar reference signs always represent the same or similar components or components with the same or similar functions. The embodiments described below with reference to the drawings are exemplary and intended to explain the disclosure and should not be understood as limits to the disclosure.

A method and device for double-camera-based imaging of the embodiments of the disclosure will be described below with reference to the drawings.

FIG. 1 illustrates a flowchart of a method for double-camera-based imaging according to an embodiment of the disclosure.

As illustrated in FIG. 1, the method for double-camera-based imaging includes the following actions.

In S101, a first image is acquired by a main camera, and a second image is acquired by an auxiliary camera.

The method of the embodiment is applied to a mobile terminal including double cameras. For convenient distinction, the double cameras may be called a first camera and a second camera respectively. In the first camera and the second camera, one serves as a main camera to acquire the first image configured for imaging, and the other serves as an auxiliary camera to acquire the second image configured to calculate a field depth as a reference.

For achieving a relatively good imaging effect, as a possible implementation mode, a resolution of the first camera is higher than that of the second camera and an ISO (International Organization for Standardization) value of the second camera is higher than that of the first camera. The main camera and the auxiliary camera may be selected from the first camera and the second camera according to a shooting scenario. Specifically, before the first image is acquired by the main camera and the second image is acquired by the auxiliary image, it is necessary to determine ambient luminance and determine the main camera and auxiliary camera in the double cameras according to the ambient luminance, and the first image shot for imaging and the second image shot for calculation of the field depth are acquired according to the determined main camera and auxiliary camera respectively. In a subsequent embodiment, this process will be described in more detail and will not be elaborated in the embodiment.

In S102, a selected shooting mode is determined.

Specifically, the shooting mode includes a full-length mode and a half-length mode. The full-length mode is applied to a scenario where a full-length portrait is required to be shot during portrait shooting. When a user selects the full-length mode, the user may usually locate the whole portrait in a finder frame during view finding.

The half-length mode is applied to a scenario where a half-length portrait is required to be shot during portrait shooting. The half-length portrait mentioned herein is usually an upper body, i.e., the head and the upper body part. When the user selects the half-length mode, the user may usually locate an upper body portrait in the finder frame during view finding.

As a possible implementation mode, a control may be provided in a shooting preview interface of the mobile terminal to enable the user to select the shooting mode through the control.

In S103, a main image resolution is determined according to the shooting mode and a resolution of the main camera, and an auxiliary image resolution is determined according to the shooting mode and a resolution of the auxiliary camera.

Specifically, if the shooting mode is the full-length mode, a multiplication operation is performed on the resolution of the main camera and a regulation coefficient corresponding to the full-length mode according to the resolution of the determined main camera to obtain the main image resolution; and the multiplication operation is performed on the resolution of the auxiliary camera and the regulation coefficient corresponding to the full-length mode according to the resolution of the determined auxiliary camera to obtain the auxiliary image resolution.

The regulation coefficient mentioned herein is configured to indicate a proportional relationship between a regulated resolution and an unregulated resolution in an image resolution regulation process. Here, a value range of the regulation coefficient is greater than 1 and 0 to 1. Specifically, if the regulated resolution is higher than the unregulated resolution, a value of the regulation coefficient is greater than 1, and if the regulated resolution is lower than the unregulated resolution, the value of the regulation coefficient is 0 to 1.

Specifically, when the shooting mode is the half-length mode, the multiplication operation is performed on the resolution of the main camera and a regulation coefficient corresponding to the half-length mode according to the resolution of the determined main camera to obtain the main image resolution; and the multiplication operation is performed on the resolution of the auxiliary camera and the regulation coefficient corresponding to the half-length mode according to the resolution of the determined auxiliary camera.

It is to be noted that the regulation coefficient corresponding to the full-length mode is higher than the regulation coefficient corresponding to the half-length mode.

In S104, the first image is converted into a main image with the main image resolution.

The first image is shot according to the main camera, a resolution of the first image is the same as the resolution of the main camera, and the main image resolution is obtained by multiplying the resolution of the main camera by the regulation coefficient corresponding to the shooting mode. Therefore, under the condition that the regulation coefficient corresponding to the shooting mode is a positive number less than or equal to 1, the resolution of the first image is higher than or equal to the main image resolution. Specifically, if the resolution of the first image is higher than the main image resolution, a target region with the main image resolution in the first image is cropped to obtain the main image; and if the resolution of the first image is equal to the main image resolution, the first image is the main image.

In S105, the second image is converted into an auxiliary image with the auxiliary image resolution.

The second image is shot according to the auxiliary camera, a resolution of the second image is the same as the resolution of the auxiliary camera, and the auxiliary image resolution is obtained by multiplying the resolution of the auxiliary camera by the regulation coefficient corresponding to the shooting mode. Therefore, under the condition that the regulation coefficient corresponding to the shooting mode is a positive number less than or equal to 1, the resolution of the second image is higher than or equal to the auxiliary image resolution. Specifically, if the resolution of the second image is higher than the auxiliary image resolution, a target region with the auxiliary image resolution in the second image is cropped to obtain the auxiliary image; and if the resolution of the second image is equal to the auxiliary image resolution, the second image is the auxiliary image.

In S106, depth information of the main image is calculated according to the main image and the auxiliary image.

Specifically, the main image and the auxiliary image are shot by different cameras respectively and there is a certain distance between the two cameras, so that a parallax is formed. According to a triangulation ranging principle, depth information of the same object in the main image and the auxiliary image, i.e., a distance between the object and a plane where the main and auxiliary cameras are located, may be calculated.

For clearly describing the process, the triangulation ranging principle will be briefly introduced below.

Figure 2:
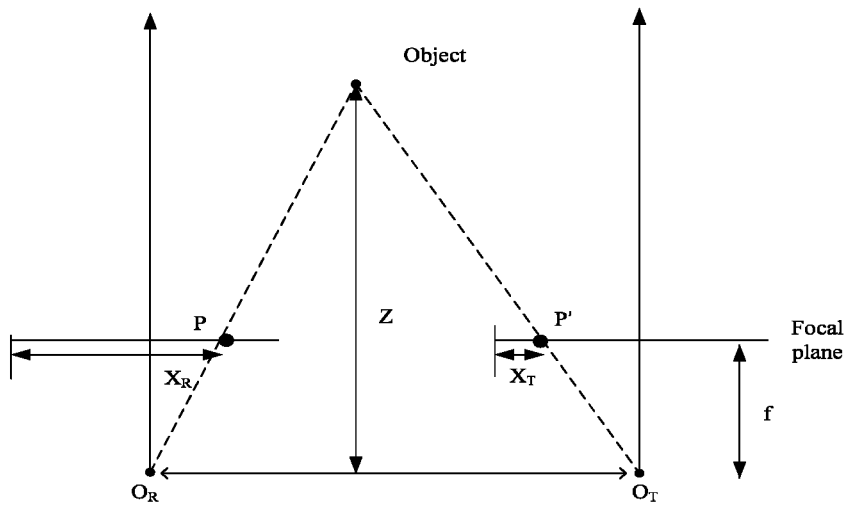
FIG. 2 illustrates a schematic diagram of a triangulation ranging principle.

In a practical scenario, a depth of a photographic field is mainly resolved by binocular vision when being resolved by eyes. This is the same as a principle of resolving the depth by double cameras. In the embodiment, a main method for calculating the depth information of the main image according to the main image and the auxiliary image is the triangulation ranging principle. FIG. 2 is a schematic diagram of the triangulation ranging principle.

In FIG. 2, an imaging object, positions $O_R$ and $O_T$ of the two cameras and a focal plane of the two cameras are drawn in a practical space, a distance between the focal plane and the plane where the two cameras are located is f, and the two cameras perform imaging at a position of the focal plane, thereby obtaining two shot images.

P and P' are positions of the same object in different shot images respectively. A distance between P and a left-side boundary of the corresponding shot image is $X_R$, and a distance between P' and a left-side boundary of the corresponding shot image is $X_T$. $O_R$ and $O_T$ are the two cameras respectively, and the two cameras are located in the same plane at a distance B.

On the basis of the triangulation ranging principle, there exists the following relationship for the distance Z between the object and plane where the two cameras are located in FIG. 2:

$$\frac{B}{Z} = \frac{(B + X_T) - X_R}{Z - f}.$$

On such a basis, $$Z = \frac{B\_f}{X_R - X_T} = \frac{B\_f}{d}$$

may be calculated, where d is a distance difference between the positions of the same object in different shot images.

Since B and f are fixed values, the distance Z of the object may be determined according to d.

In S107, blurring processing is performed on the main image according to the depth information of the main image to obtain a required target image.

Specifically, after the depth information of the main image is calculated, whether an object is a foreground or a background may be determined according to depth information of the object in the main image. In general, when the depth information indicates that the object is relatively close to the plane where the main and auxiliary cameras are located and a depth value is relatively small, it may be determined that the object is a foreground, otherwise the object is a background.

Blurring processing may be performed on the recognized background to obtain a target image. In the target image, the foreground is more highlighted, the background is blurred, and a foreground-focused imaging effect is achieved.

In the method for double-camera-based imaging of the embodiment of the application, the main camera acquires the first image and the auxiliary camera acquires the second image, the main image resolution and the auxiliary image resolution are determined according to the determined shooting mode and the resolutions of the main camera and the auxiliary camera respectively, the first image is converted into the main image with the main image resolution, the second image is converted into the auxiliary image with the auxiliary image resolution, the depth information of the main image is acquired according to the main image and the auxiliary image, and blurring processing is performed on the main image to obtain the required target image. The main image resolution and the auxiliary image resolution are determined according to the shooting mode and the resolutions of the main and auxiliary cameras to implement regulation of a resolution of a shot image and solve the technical problem in the conventional art that a fixed resolution is usually adopted by double cameras for subsequent image processing after an image is shot to result in a relatively undiversified function and make it impossible for a user to regulate the resolution according to a requirement.

On the basis of the previous embodiment, for more clearly describing how to determine the resolutions of the main image and the auxiliary image in different shooting modes to implement a method by which not only is an imaging effect ensured but also a resolution of a shot image may be flexibly regulated, an embodiment of the application provides another possible implementation mode of a method for double-camera-based imaging.

Figure 3:
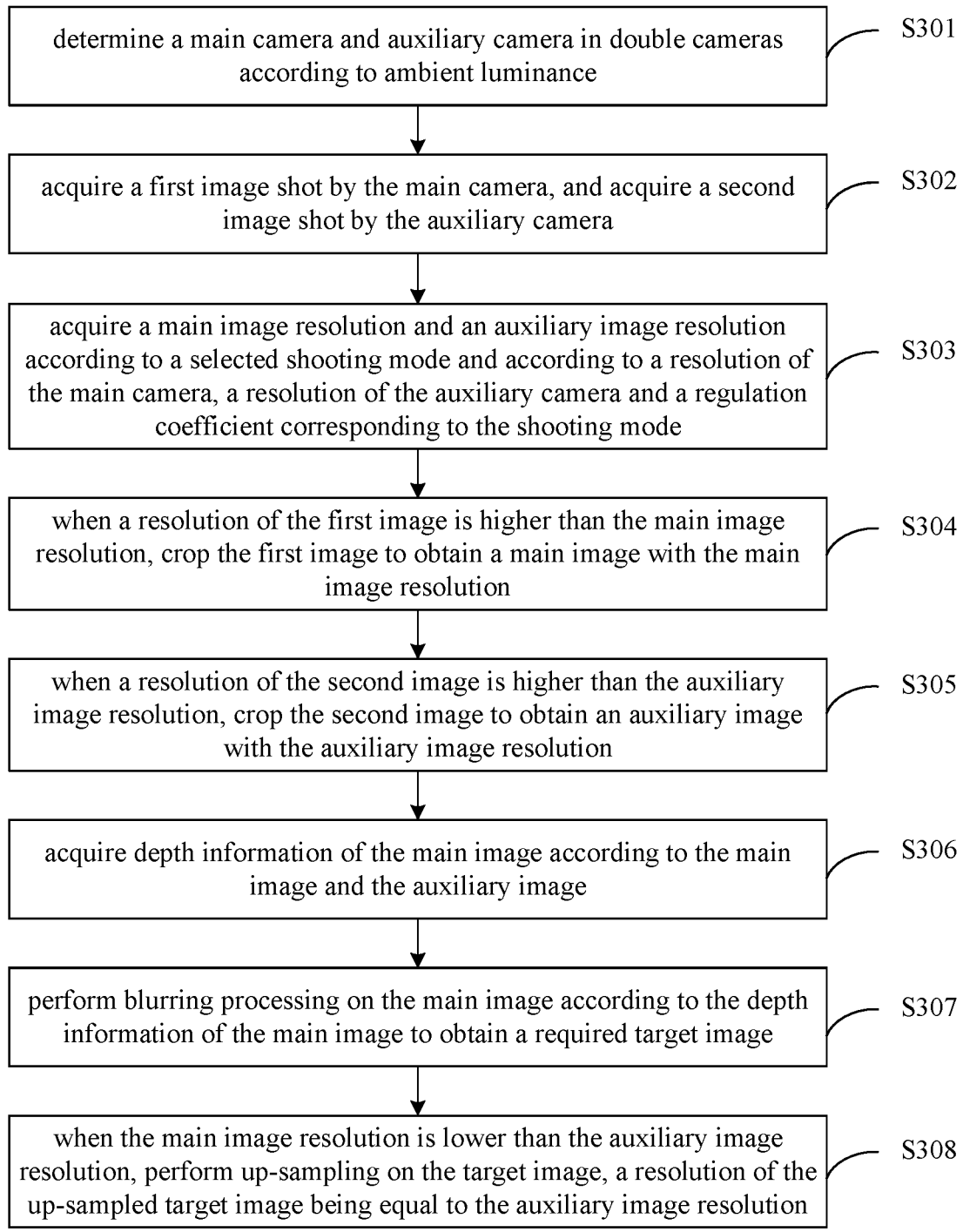
FIG. 3 illustrates a flowchart of another method for double-camera-based imaging according to an embodiment of the disclosure.

FIG. 3 illustrates a flowchart of another method for double-camera-based imaging according to an embodiment of the disclosure. As illustrated in FIG. 3, the method includes the following actions.

In S301, a main camera and auxiliary camera in double cameras are determined according to ambient luminance.

Specifically, as a possible implementation form, an independent photometer may be adopted to measure the ambient luminance.

As another possible implementation form, ISO values automatically regulated by a first camera and a second camera may be read and the ambient luminance is determined according to the read ISO values. In general, the first camera and the second camera should adopt the same ISO value, so that the corresponding ambient luminance may be determined by adopting the ISO value. However, if the read ISO value of the first camera and ISO value of the second camera are different, the corresponding ambient luminance may be determined according to an average value of the two.

It is to be noted that an ISO value is configured to indicate an ISO value of a camera. Common ISO values include 50, 100, 200, 400, 1,000 and the like. A camera may automatically an ISO value according to ambient luminance. Therefore, in the embodiment, the ambient luminance may be reversely calculated according to the ISO values. In general, under a sufficient light condition, the ISO value is 50 or 100, and under an insufficient light condition, the ISO value may be 400 or higher.

The double cameras include the first camera and the second camera. A resolution of the first camera is higher than that of the second camera and an ISO value of the second camera is higher than that of the first camera. For example, the first camera may be a 16 MP camera, and the second camera may be an 8 MP camera.

Specifically, if the ambient luminance is higher than threshold luminance, the first camera is determined as the main camera, and the second camera is determined as the auxiliary camera. If the ambient luminance is not higher than the threshold luminance, the second camera is determined as the main camera, and the first camera is determined as the auxiliary camera.

This is because, when the high-resolution camera is adopted for photographing as the main camera in case of insufficient light under the condition that the ambient luminance is not higher than the threshold luminance, more noise may be produced to cause a poor imaging effect. Therefore, in case of sufficient light, the high-ISO camera may be adopted for photographing as the main camera to reduce noise in the image and improve the imaging effect.

On the contrary, when there is sufficient light under the condition that the ambient luminance is higher than the threshold luminance, the resolution of the high-resolution camera is relatively high, a relatively sharp image may be formed with less noise, so that the high-resolution camera may be adopted for photographing as the main camera, and the high-ISO camera is adopted to calculate relatively accurate depth information as the auxiliary camera. Therefore, the imaging effect is improved.

In S302, a first image is acquired by the main camera, and a second image is acquired by the auxiliary camera.

For example, when the ambient luminance is higher than the threshold luminance, the first camera of which the resolution is 16M is determined as the main camera, and a resolution of the first image shot by it is 16M; and the second camera of which the resolution is 8M is determined as the auxiliary camera, and a resolution of the second image shot by it is 8M.

When the ambient luminance is lower than the threshold luminance, the second camera of which the resolution is 8M is determined as the main camera, and the resolution of the first image shot by it is 8M; and the first camera of which the resolution is 16M is determined as the auxiliary camera, and the resolution of the second image shot by it is 16M.

In S303, a main image resolution and an auxiliary image resolution are acquired according to a selected shooting mode and according to a resolution of the main camera, a resolution of the auxiliary camera and a regulation coefficient corresponding to the shooting mode.

Specifically, the shooting mode includes a full-length mode and a half-length mode. A regulation coefficient corresponding to the full-length mode is higher than a regulation coefficient corresponding to the half-length mode. As a possible implementation mode, the regulation coefficient corresponding to the full-length mode is 1, and the regulation coefficient corresponding to the half-length mode is 0.5.

For example, when the shooting mode selected by a user is the full-length mode, if the ambient luminance is higher than the threshold luminance, the resolution 16M of the main camera and the resolution 8M of the auxiliary camera are multiplied by the regulation coefficient 1 corresponding to the full-length mode to obtain the main image resolution 16M and the auxiliary image resolution 8M respectively; and if the ambient luminance is lower than the threshold luminance, the resolution 8M of the main camera and the resolution 16M of the auxiliary camera are multiplied by the regulation coefficient 1 corresponding to the full-length mode to obtain the main image resolution 8M and the auxiliary image resolution 16M respectively.

For example, when the shooting mode selected by the user is the half-length mode, if the ambient luminance is higher than the threshold luminance, the resolution 16M of the main camera and the resolution 8M of the auxiliary camera are multiplied by the regulation coefficient 0.5 corresponding to the half-length mode to obtain the main image resolution 8M and the auxiliary image resolution 4M respectively; and if the ambient luminance is lower than the threshold luminance, the resolution 8M of the main camera and the resolution 16M of the auxiliary camera are multiplied by the regulation coefficient 0.5 corresponding to the half-length mode to obtain the main image resolution 4M and the auxiliary image resolution 8M respectively.

It is to be noted that the regulation coefficients corresponding to the full-length mode and the half-length mode may also be set by those skilled in the art according to a specific condition, which will not be specifically limited in the embodiment. Since the same principle is adopted, there are also no elaborations made herein.

In S304, when a resolution of the first image is higher than the main image resolution, the first image is cropped to obtain a main image with the main image resolution.

A target region is a central region in the first image. Since a periphery of the shot image is distorted and image quality of the central region is relatively high, cropping the central region of the first image as the main image may ensure imaging quality of the main image.

Specifically, when the ambient luminance is higher than the threshold luminance, the resolution of the first image is 16M. If the user presently selects the full-length mode, the main image resolution is 16M, the resolution of the first image is the same as the main image resolution, it is unnecessary to crop the first image, the first image is directly determined as the main image, and the main image resolution is 16M; and if the user presently selects the half-length mode, the main image resolution is 8M, the resolution of the first image is higher than the main image resolution, a region with the main image resolution 8M is cropped from the central region of the first image as the main image, and the main image resolution is 8M.

When the ambient luminance is lower than the threshold luminance, the resolution of the first image is 8M. If the user presently selects the full-length mode, the main image resolution is 8M, the resolution of the first image is the same as the main image resolution, it is unnecessary to crop the first image, the first image is directly determined as the main image, and the main image resolution is 8M; and if the user presently selects the half-length mode, the main image resolution is 4M, the resolution 8M of the first image is higher than the main image resolution 4M, a region with the main image resolution 4M is cropped from the central region of the first image as the main image, and the main image resolution is 4M.

In S305, when a resolution of the second image is higher than the auxiliary image resolution, the second image is cropped to obtain an auxiliary image with the auxiliary image resolution.

Specifically, when the ambient luminance is higher than the threshold luminance, the resolution of the second image is 8M. If the user presently selects the full-length mode, the auxiliary image resolution is 8M, the resolution of the second image is the same as the auxiliary image resolution, it is unnecessary to crop the second image, the second image is directly determined as the auxiliary image, and the auxiliary image resolution is 8M; and if the user presently selects the half-length mode, the auxiliary image resolution is 4M, the resolution of the second image is higher than the auxiliary image resolution, a region with the auxiliary image resolution 4M is cropped from the central region of the second image as the auxiliary image, and the auxiliary image resolution is 4M.

When the ambient luminance is lower than the threshold luminance, the resolution of the second image is 16M. If the user presently selects the full-length mode, the auxiliary image resolution is 16M, the resolution of the second image is the same as the auxiliary image resolution, it is unnecessary to crop the second image, the second image is directly determined as the auxiliary image, and the auxiliary image resolution is 16M; and if the user presently selects the half-length mode, the auxiliary image resolution is 8M, the resolution 16M of the second image is higher than the auxiliary image resolution 8M, a region with the auxiliary image resolution 8M is cropped from the central region of the second image as the auxiliary image, and the auxiliary image resolution is 8M.

In S306, depth information of the main image is acquired according to the main image and the auxiliary image.

Specifically, the depth information of the main image is determined according to a position deviation of the same object in the main image and the auxiliary image and parameters of the double cameras.

A specific calculation process refers to related descriptions about action S106 in the abovementioned embodiment and will not be elaborated in the embodiment.

In S307, blurring processing is performed on the main image according to the depth information of the main image to obtain a required target image.

Specifically, after the depth information of the main image is calculated, whether an object is a foreground or a background may be determined according to depth information of the object in the main image. In general, when the depth information indicates that the object is relatively close to the plane where the main and auxiliary cameras are located and a depth value is relatively small, it may be determined that the object is a foreground, otherwise the object is a background.

Blurring processing may be performed on the recognized background to obtain a target image. In the target image, the foreground is more highlighted, the background is blurred, and a foreground-focused imaging effect is achieved.

In S308, if the main image resolution is lower than the auxiliary image resolution, up-sampling is performed on the target image, a resolution of the up-sampled target image being equal to the auxiliary image resolution.

Specifically, as described in action S303, when the ambient luminance is lower than the threshold luminance, the acquired main image resolution is lower than the auxiliary image resolution, up-sampling is performed on the resolution of the target image, for example, an interpolation method is adopted for up-sampling, and the resolution of the target image obtained by up-sampling is equal to the auxiliary image resolution.

For example, in the full-length mode, the main image resolution is 8M, the auxiliary image resolution is 16M, the resolution of the target image obtained by blurring processing over the main image is 8M, up-sampling is performed on the target image to obtain the target image of which the resolution is 16M, and the resolution of the up-sampled target image is equal to the auxiliary image resolution and is 16M.

This is because the second camera with a relatively low resolution and a relatively high ISO value is selected to acquire the main image in a dark environment, and the main image is relatively low in resolution but high in imaging quality. Up-sampling is performed on the main image, so that imaging quality in the dark environment is ensured, the resolution of the target image is improved, and the resolution of the target image is equal to the relatively high auxiliary image resolution.

In the method for double-camera-based imaging of the embodiment of the application, the main camera acquires the first image and the auxiliary camera acquires the second image, the main image resolution and the auxiliary image resolution are determined according to the determined shooting mode and the resolutions of the main camera and the auxiliary camera respectively, the first image is converted into the main image with the main image resolution, the second image is converted into the auxiliary image with the auxiliary image resolution, the depth information of the main image is acquired according to the main image and the auxiliary image, and blurring processing is performed on the main image to obtain the required target image. The main image resolution and the auxiliary image resolution are determined according to the shooting mode and the resolutions of the main and auxiliary cameras to implement regulation of a resolution of a shot image. The full-length mode refers to full-resolution imaging, and a sharper image may be formed; and the half-length mode refers to cropping a central region from an original image for imaging, influence of distortion of a periphery of the image may be reduced, a subject may be highlighted more, and meanwhile, a processing speed is increased. The two modes may also be switched to achieve a similar zooming effect.

In order to implement the abovementioned embodiments, the disclosure further discloses a device for double-camera-based imaging.

Figure 4:
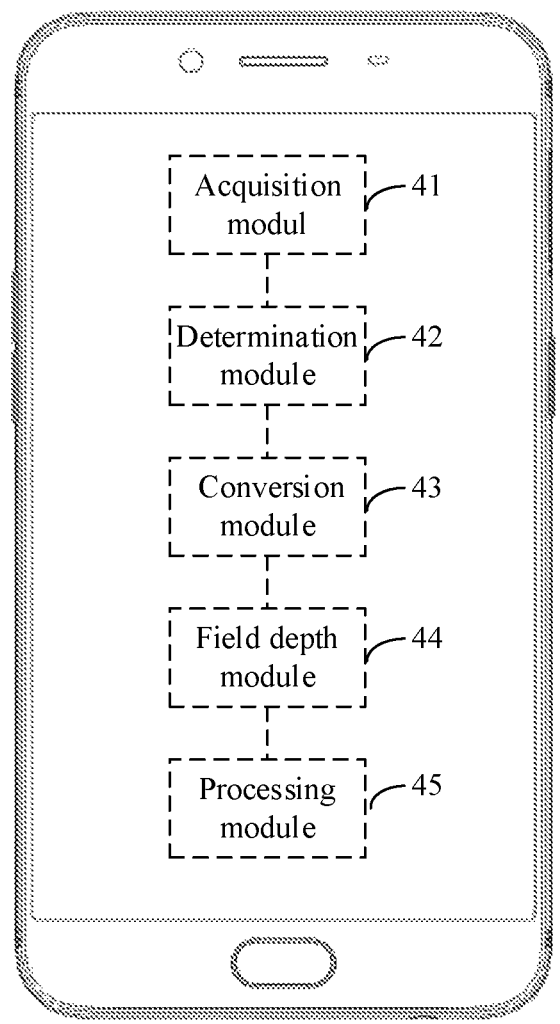
FIG. 4 illustrates a structure diagram of a device for double-camera-based imaging according to an embodiment of the application.

FIG. 4 is a structure diagram of a device for double-camera-based imaging according to an embodiment of the application. As illustrated in FIG. 4, the device includes: an acquisition module 41, a determination module 42, a conversion module 43, a field depth module 44 and a processing module 45.

The acquisition module 41 is configured to acquire a first image by a main camera and acquire a second image by an auxiliary camera.

The determination module 42 is configured to determine a selected shooting mode, determine a main image resolution according to the shooting mode and a resolution of the main camera and determine an auxiliary image resolution according to the shooting mode and a resolution of the auxiliary camera. The shooting mode includes a full-length mode and a half-length mode.

The conversion module 43 is configured to convert the first image into a main image with the main image resolution and convert the second image into an auxiliary image with the auxiliary image resolution.

The field depth module 44 is configured to acquire depth information of the main image according to the main image and the auxiliary image.

The processing module 45 is configured to perform blurring processing on the main image according to the depth information of the main image to obtain a required target image.

It is to be noted that explanations and descriptions about the abovementioned method embodiment are also applied to the device of the embodiment and will not be elaborated herein.

In the device for double-camera-based imaging of the embodiment of the application, the acquisition module is configured to acquire the first image by the main camera and acquire the second image by the auxiliary camera, the determination module is configured to determine the selected shooting mode, determine the main image resolution according to the shooting mode and the resolution of the main camera and determine the auxiliary image resolution according to the shooting mode and the resolution of the auxiliary camera, the conversion module is configured to convert the first image into the main image with the main image resolution and convert the second image into the auxiliary image with the auxiliary image resolution, the field depth module is configured to acquire the depth information of the main image according to the main image and the auxiliary image, and the processing module is configured to perform blurring processing on the main image according to the depth information of the main image to obtain the required target image. In the embodiment, the main image resolution and the auxiliary image resolution are determined according to the shooting mode and the resolutions of the main and auxiliary cameras to implement regulation of a resolution of a shot image and solve the technical problem in the conventional art that a fixed resolution is usually adopted by double cameras for subsequent image processing after an image is shot to result in a relatively undiversified function and make it impossible for a user to regulate the resolution according to a requirement.

Figure 5:
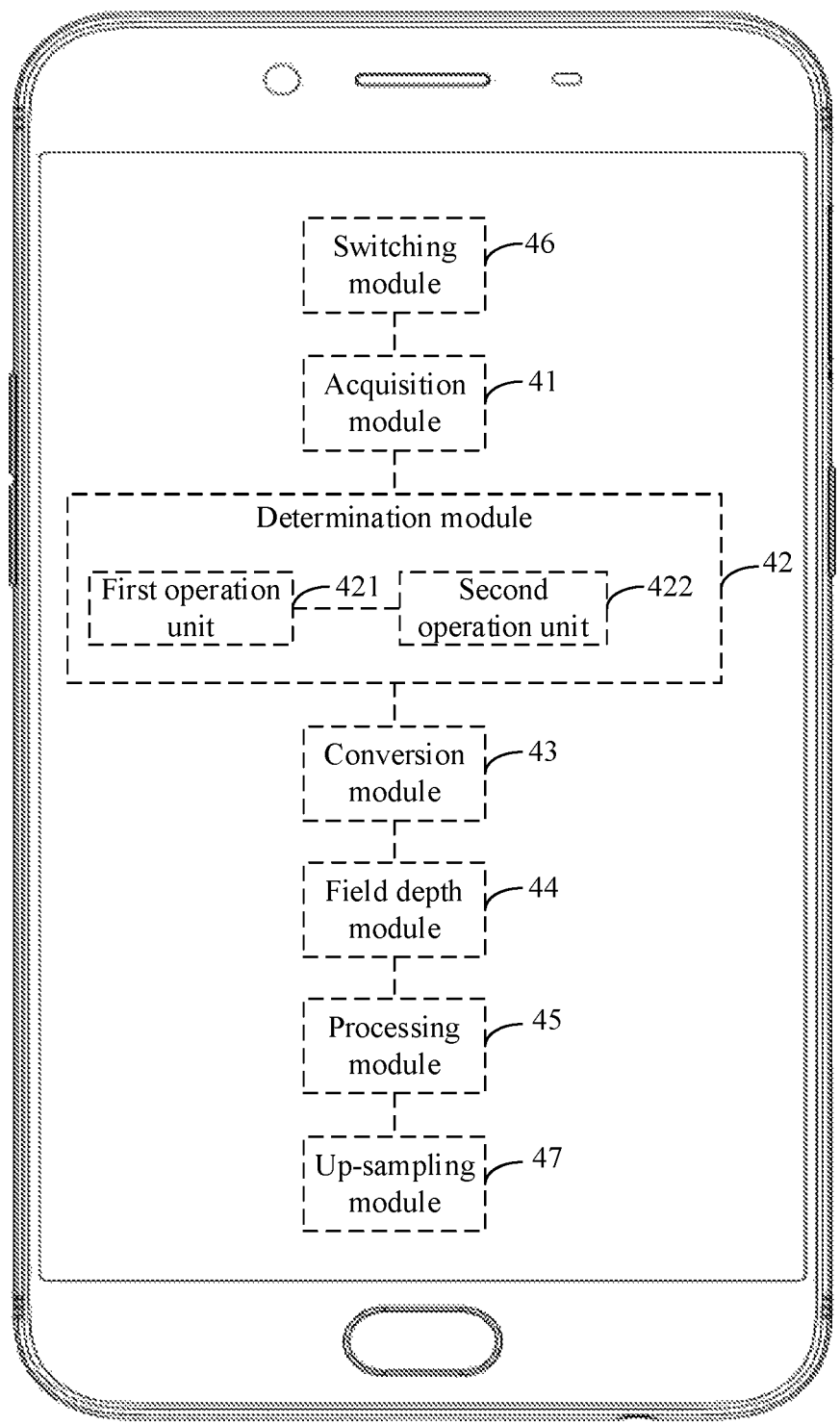
FIG. 5 illustrates a structure diagram of another device for double-camera-based imaging according to an embodiment of the application.

On the basis of the abovementioned embodiments, the application further discloses a possible implementation mode of a device for double-camera-based imaging. FIG. 5 is a structure diagram of another device for double-camera-based imaging according to an embodiment of the application. As illustrated in FIG. 5, on the basis of the previous embodiment, the device may further include: a switching module 46 and an up-sampling module 47.

The switching module 46 is configured to, if ambient luminance is higher than threshold luminance, determine a first camera as the main camera and determine a second camera as the auxiliary camera; and if the ambient luminance is lower than the threshold luminance, determine the second camera as the main camera and determine the first camera as the auxiliary camera.

The up-sampling module 47 is configured to, if the main image resolution is lower than the auxiliary image resolution, performing up-sampling on the target image, a resolution of the up-sampled target image being equal to the auxiliary image resolution. In a possible implementation mode of the embodiment of the application, the determination module 42 may further include: a first operation unit 421 and a second operation unit 422.

The first operation unit 421 is configured to acquire the main image resolution according to the resolution of the main camera and a regulation coefficient corresponding to the shooting mode.

The second operation unit 422 is configured to acquire the auxiliary image resolution according to the resolution of the auxiliary camera and the regulation coefficient corresponding to the shooting mode.

Furthermore, in a possible implementation mode of the embodiment of the application, the conversion module 43 may specifically be configured to, if a resolution of the first image is higher than the main image resolution, crop the first image to obtain the main image with the main image resolution; and if a resolution of the second image is higher than the auxiliary image resolution, crop the second image to obtain the auxiliary image with the auxiliary image resolution.

It is to be noted that explanations and descriptions about the abovementioned method embodiment are also applied to the device of the embodiment and will not be elaborated herein.

In the device for double-camera-based imaging of the embodiment of the application, the acquisition module is configured to acquire the first image by the main camera and acquire the second image by the auxiliary camera, the determination module is configured to determine the selected shooting mode, determine the main image resolution according to the shooting mode and the resolution of the main camera and determine the auxiliary image resolution according to the shooting mode and the resolution of the auxiliary camera, the conversion module is configured to convert the first image into the main image with the main image resolution and convert the second image into the auxiliary image with the auxiliary image resolution, the field depth module is configured to acquire the depth information of the main image according to the main image and the auxiliary image, and the processing module is configured to perform blurring processing on the main image according to the depth information of the main image to obtain the required target image. In the embodiment, the main image resolution and the auxiliary image resolution are determined according to the shooting mode and the resolutions of the main and auxiliary cameras to implement regulation of a resolution of a shot image. The full-length mode refers to full-resolution imaging, and a sharper image may be formed; and the half-length mode refers to cropping a central region from an original image for imaging, influence of distortion of a periphery of the image may be reduced, a subject may be highlighted more, and meanwhile, a processing speed is increased. The two modes may also be switched to achieve a similar zooming effect.

Figure 6:
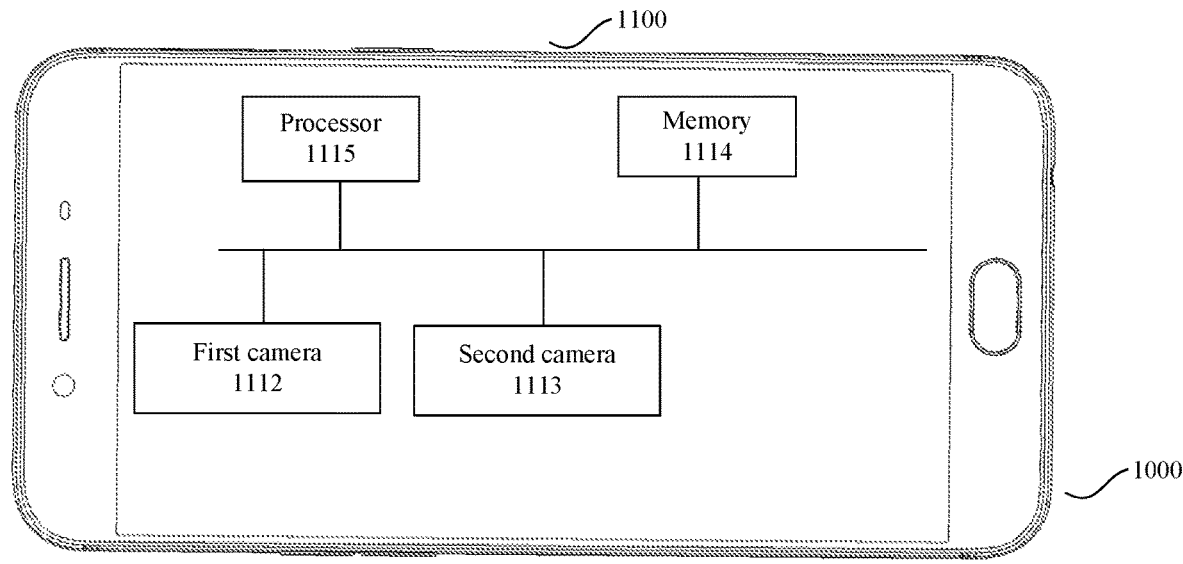
FIG. 6 illustrates a structure diagram of terminal equipment according to another embodiment of the disclosure.

In order to implement the abovementioned embodiments, the disclosure further discloses a mobile terminal. FIG. 6 is a structure diagram of terminal equipment according to another embodiment of the disclosure. As illustrated in FIG. 6, the terminal equipment 1000 includes: a shell 1100, and a first camera 1112, second camera 1113, memory 1114 and processor 1115 which are located in the shell 1100.

An executable program code is stored in the memory 1114; and the processor 1115 reads the executable program code stored in the memory 1114 to run a program corresponding to the executable program code to determine a main camera and auxiliary camera in the double cameras and control the main camera and the auxiliary camera to shoot to implement the method for double-camera-based imaging of the abovementioned method embodiment.

A resolution of the first camera is higher than that of the second camera, and an ISO value of the second camera is higher than that of the first camera.

For endowing a high resolution to the first camera, a 16M camera may be adopted, and of course, another high-resolution camera may also be adopted. There are no limits made thereto in the embodiment.

In addition, for endowing a high ISO value to the second camera, an 8M camera may be adopted to ensure larger pixel particles and a high ISO value, and of course, another high-ISO camera may also be adopted. There are no limits made thereto in the embodiment.

In order to implement the abovementioned embodiments, the disclosure further discloses a computer-readable storage medium, on which a computer program is stored. The program is executed by a processor of a mobile terminal to implement the method for double-camera-based imaging in the abovementioned embodiments.

Figure 7:
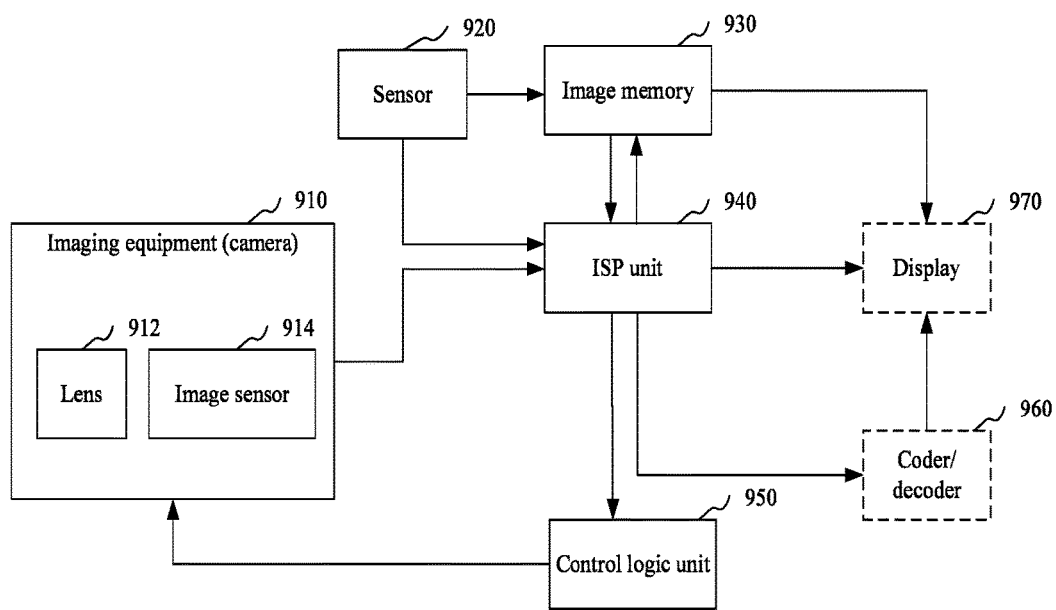
FIG. 7 illustrates a schematic diagram of an image processing circuit according to an embodiment.

The mobile terminal further includes an image processing circuit, and the image processing circuit may be implemented by use of a hardware and/or software component, and may include various processing units defining an Image Signal Processing (ISP) pipeline. FIG. 7 is a schematic diagram of an image processing circuit according to an embodiment. As illustrated in FIG. 7, each aspect of an image processing technology related to the embodiments of the disclosure is illustrated only, for convenient description.

As illustrated in FIG. 7, the image processing circuit includes an ISP unit 940 and a control logic unit 950. Image data captured by imaging equipment 910 is processed by the ISP unit 940 at first, and the ISP unit 940 analyzes the image data to capture image statistical information configurable to determine one or more control parameters of the ISP unit and/or the imaging equipment 910. The imaging equipment 910 may specifically include two cameras, and each camera may include one or more lenses 912 and an image sensor 914. The image sensor 914 may include a color filter array (for example, a Bayer filter), and the image sensor 914 may acquire light intensity and wavelength information captured by each imaging pixel of the image sensor 914 and provide a set of original image data processible for the ISP unit 940. A sensor 920 may provide the original image data for the ISP unit 940 on the basis of an interface type of the sensor 920. An interface of the sensor 920 may adopt a Standard Mobile Imaging Architecture (SMIA) interface, another serial or parallel camera interface or a combination of the interfaces.

The ISP unit 940 processes the original image data pixel by pixel according to multiple formats. For example, each image pixel may have a bit depth of 8, 10, 12 or 14 bits. The ISP unit 940 may execute one or more image processing operations on the original image data and collect the image statistical information about the image data. The image processing operations may be executed according to the same or different bit depth accuracy.

The ISP unit 940 may further receive the pixel data from an image memory 930. For example, the interface of the sensor 920 sends the original pixel data to the image memory 930, and the original pixel data in the image memory 930 is provided for the ISP unit 940 for processing. The image memory 930 may be a part of a memory device, storage equipment or an independent dedicated memory in electronic equipment, and may include a Direct Memory Access (DMA) feature.

When receiving the original image data from the interface of the sensor 920 or from the image memory 930, the ISP unit 940 may execute the one or more image processing operations, for example, time-domain filtering. The processed image data may be sent to the image memory 930 for other processing before displaying. The ISP unit 940 receives the processed data from the image memory 930 and performs image data processing in an original domain and color spaces Red, Green and Blue (RGB) and YCbCr on the processed data. The processed image data may be output to a display 970 for a user to view and/or for further processing by a Graphics Processing Unit (GPU). In addition, output of the ISP unit 940 may further be sent to the image memory 930, and the display 970 may read the image data from the image memory 930. In an embodiment, the image memory 930 may be configured to implement one or more frame buffers. Moreover, the output of the ISP unit 940 may be sent to a coder/decoder 960 to code/decode the image data. The coded image data may be stored, and is decompressed before being displayed on the display 970. The coder/decoder 960 may be implemented by a Central Processing Unit (CPU) or a GPU or a coprocessor.

The statistical information determined by the ISP unit 940 may be sent to the control logic unit 950. For example, the statistical information may include statistical information of automatic exposure, automatic white balance, automatic focusing, flashing detection, black level compensation, shading correction of the lens 912 and the like of the image sensor 914. The control logic unit 950 may include a processor and/microcontroller executing one or more routines (for example, firmware), and the one or more routines may determine the control parameter of the imaging equipment 910 and the control parameter of the ISP unit according to the received statistical data. For example, the control parameter may include a control parameter (for example, integral time for gain and exposure control) for the sensor 920, a camera flashing control parameter, a control parameter (for example, a focal length for focusing or zooming) for the lens 912 or a combination of these parameters. The control parameter for the ISP unit may include a gain level and color correction matrix configured for automatic white balance and color regulation (for example, during RGB processing) and a shading correction parameter for the lens 912.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or actions of the process and, moreover, the scope of the preferred implementation mode of the disclosure includes other implementation, not in a sequence illustrated or discussed herein, including execution of the functions basically simultaneously or in an opposite sequence according to the involved functions. This should be understood by those skilled in the art of the embodiments of the disclosure.

Logics and/or actions represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It should be understood that each part of the disclosure may be implemented by hardware, software, firmware or a combination thereof. In the abovementioned implementation modes, multiple actions or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the actions in the method of the abovementioned embodiment may be completed through related hardware instructed by a program, the program may be stored in a computer-readable storage medium, and when the program is executed, one or combination of the actions of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a read-only memory, a magnetic disk, an optical disk or the like. The embodiments of the disclosure have been illustrated or described above. However, it can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A method for double-camera-based imaging, the method comprising the following actions:
   acquiring a first image by a main camera, and acquiring a second image by an auxiliary camera;
   determining a selected shooting mode;
   determining a main image resolution according to a regulation coefficient corresponding to the shooting mode and a resolution of the main camera, and determining an auxiliary image resolution according to the regulation coefficient corresponding to the shooting mode and a resolution of the auxiliary camera, wherein the shooting mode comprises a full-length mode and a half-length mode; and the full-length mode has a regulation coefficient that is higher than a regulation coefficient corresponding to the half-length mode;
   converting the first image into a main image with the main image resolution;
   converting the second image into an auxiliary image with the auxiliary image resolution; and
   obtaining a required target image according to the main image and the auxiliary image.

2. The method according to claim 1, wherein obtaining the required target image according to the main image and the auxiliary image comprises:
   acquiring depth information of the main image according to the main image and the auxiliary image; and
   performing blurring processing on the main image according to the depth information of the main image to obtain the required target image.

3. The method according to claim 2, wherein after performing blurring processing on the main image according to the depth information of the main image to obtain the required target image, the method further comprises:
   when the main image resolution is lower than the auxiliary image resolution, performing up-sampling on the target image, a resolution of the up-sampled target image being equal to the auxiliary image resolution.

4. The method according to claim 1, wherein converting the first image into the main image with the main image resolution comprises:
   when a resolution of the first image is higher than the main image resolution, cropping the first image to obtain the main image with the main image resolution.

5. The method according to claim 1, wherein converting the second image into the auxiliary image with the auxiliary image resolution comprises:
   when a resolution of the second image is higher than the auxiliary image resolution, cropping the second image to obtain the auxiliary image with the auxiliary image resolution.

6. The method according to claim 1, wherein the double cameras comprise a first camera and a second camera, a resolution of the first camera is higher than a resolution of the second camera, and an ISO (International Organization for Standardization) value of the second camera is higher than an ISO value of the first camera; and before acquiring the first image by the main camera and acquiring the second image by the auxiliary camera, the method further comprises:
   when ambient luminance is higher than threshold luminance, determining the first camera as the main camera, and determining the second camera as the auxiliary camera; and
   when the ambient luminance is no higher than the threshold luminance, determining the second camera as the main camera, and determining the first camera as the auxiliary camera.

7. A device for double-camera-based imaging, the device comprising a processor and a memory storing instructions, wherein the instructions, when executed by the processor, cause the processor to perform the following actions:
   acquiring a first image by a main camera, and acquiring a second image by an auxiliary camera;
   determining a selected shooting mode;
   determining a main image resolution according to a regulation coefficient corresponding to the shooting mode and a resolution of the main camera, and determining an auxiliary image resolution according to the regulation coefficient corresponding to the shooting mode and a resolution of the auxiliary camera, wherein the shooting mode comprises a full-length mode and a half-length mode; and the full-length mode has a regulation coefficient that is higher than a regulation coefficient corresponding to the half-length mode;
   converting the first image into a main image with the main image resolution;
   converting the second image into an auxiliary image with the auxiliary image resolution; and
   obtaining a required target image according to the main image and the auxiliary image.

8. The device according to claim 7, wherein obtaining the required target image according to the main image and the auxiliary image comprises:
   acquiring depth information of the main image according to the main image and the auxiliary image; and
   performing blurring processing on the main image according to the depth information of the main image to obtain a required target image.

9. The device according to claim 8, wherein after performing blurring processing on the main image according to the depth information of the main image to obtain the required target image, the method further comprises:
   when the main image resolution is lower than the auxiliary image resolution, performing up-sampling on the target image, a resolution of the up-sampled target image being equal to the auxiliary image resolution.

10. The device according to claim 7, wherein converting the first image into the main image with the main image resolution comprises:
    when a resolution of the first image is higher than the main image resolution, cropping the first image to obtain the main image with the main image resolution.

11. The device according to claim 7, wherein converting the second image into the auxiliary image with the auxiliary image resolution comprises:
    when a resolution of the second image is higher than the auxiliary image resolution, cropping the second image to obtain the auxiliary image with the auxiliary image resolution.

12. The device according to claim 7, wherein the double cameras comprise a first camera and a second camera, a resolution of the first camera is higher than a resolution of the second camera, and an ISO (International Organization for Standardization) value of the second camera is higher than an ISO value of the first camera; and before acquiring the first image by the main camera and acquiring the second image by the auxiliary camera, the method further comprises:
when ambient luminance is higher than threshold luminance, determining the first camera as the main camera, and determining the second camera as the auxiliary camera; and
when the ambient luminance is no higher than the threshold luminance, determining the second camera as the main camera, and determining the first camera as the auxiliary camera.

13. A non-transitory computer-readable storage medium, on which a computer program is stored, wherein the computer program is executed by a processor to implement a method for double-camera-based imaging, the method comprising the following actions:
acquiring a first image by a main camera, and acquiring a second image by an auxiliary camera;
determining a selected shooting mode;
determining a main image resolution according to a regulation coefficient corresponding to the shooting mode and a resolution of the main camera, and determining an auxiliary image resolution according to the regulation coefficient corresponding to the shooting mode and a resolution of the auxiliary camera, wherein the shooting mode comprises a full-length mode and a half-length mode; and the full-length mode has a regulation coefficient that is higher than a regulation coefficient corresponding to the half-length mode;
converting the first image into a main image with the main image resolution;
converting the second image into an auxiliary image with the auxiliary image resolution; and
obtaining a required target image according to the main image and the auxiliary image.

14. The non-transitory computer-readable storage medium according to claim 13, wherein obtaining the required target image according to the main image and the auxiliary image comprises:
acquiring depth information of the main image according to the main image and the auxiliary image; and
performing blurring processing on the main image according to the depth information of the main image to obtain a required target image.

15. The non-transitory computer-readable storage medium according to claim 14, wherein after performing blurring processing on the main image according to the depth information of the main image to obtain the required target image, the computer program is executed by a processor to:
when the main image resolution is lower than the auxiliary image resolution, performing up-sampling on the target image, a resolution of the up-sampled target image being equal to the auxiliary image resolution.

16. The non-transitory computer-readable storage medium according to claim 13, wherein converting the first image into the main image with the main image resolution comprises:
when a resolution of the first image is higher than the main image resolution, cropping the first image to obtain the main image with the main image resolution.

17. The non-transitory computer-readable storage medium according to claim 13, wherein converting the second image into the auxiliary image with the auxiliary image resolution comprises:
when a resolution of the second image is higher than the auxiliary image resolution, cropping the second image to obtain the auxiliary image with the auxiliary image resolution.

18. The non-transitory computer-readable storage medium according to claim 13, wherein the double cameras comprise a first camera and a second camera, a resolution of the first camera is higher than a resolution of the second camera, and an ISO (International Organization for Standardization) value of the second camera is higher than an ISO value of the first camera; and before acquiring the first image by the main camera and acquiring the second image by the auxiliary camera, the computer program is executed by a processor to:
when ambient luminance is higher than threshold luminance, determine the first camera as the main camera, and determining the second camera as the auxiliary camera; and
when the ambient luminance is no higher than the threshold luminance, determine the second camera as the main camera, and determining the first camera as the auxiliary camera.

* * * * *